United States Patent
Onda et al.

(10) Patent No.: US 8,910,077 B2
(45) Date of Patent: Dec. 9, 2014

(54) INFORMATION PROCESSING DEVICE AND COMPUTER READABLE MEDIUM

(75) Inventors: Yasushi Onda, Tokyo (JP); Izua Kano, Tokyo (JP); Dai Kamiya, Tokyo (JP); Keiichi Murakami, Tokyo (JP); Eiju Yamada, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 768 days.

(21) Appl. No.: 12/129,736

(22) Filed: May 30, 2008

(65) Prior Publication Data

US 2008/0301577 A1 Dec. 4, 2008

(30) Foreign Application Priority Data

May 31, 2007 (JP) ................................. 2007-145543

(51) Int. Cl.
*G06F 3/048* (2013.01)
*G06F 9/44* (2006.01)

(52) U.S. Cl.
CPC .................................... *G06F 9/4443* (2013.01)
USPC ............ 715/794; 715/790; 715/781; 715/796

(58) Field of Classification Search
USPC .................................. 715/781, 794, 796, 790
See application file for complete search history.

(56) References Cited

U.S. PATENT DOCUMENTS

| | | | |
|---|---|---|---|
| 5,482,050 A * | 1/1996 | Smokoff et al. | 600/523 |
| 2006/0075359 A1 | 4/2006 | Bachot et al. | |
| 2006/0190838 A1 * | 8/2006 | Nadamoto | 715/781 |

FOREIGN PATENT DOCUMENTS

| | | |
|---|---|---|
| CN | 1771475 A | 5/2006 |
| EP | 1617323 | 1/2006 |
| JP | 625293 A | 12/1987 |
| JP | 05011960 | 1/1993 |
| JP | 05189182 | 7/1993 |
| JP | 08161139 | 6/1996 |
| JP | 08-212043 | 8/1996 |
| JP | 09-305365 | 11/1997 |
| JP | 10149272 | 6/1998 |
| JP | 2002312090 | 10/2002 |
| JP | 2007-013845 | 1/2007 |
| WO | 96/10785 | 4/1996 |

OTHER PUBLICATIONS

Office Action for EP Application No. 08009946.8 dated Jan. 9, 2009.
European Search Report for EP Application No. 08009946.8 dated Sep. 9, 2008.

(Continued)

*Primary Examiner* — Andrey Belousov
(74) *Attorney, Agent, or Firm* — MKG, LLC (57) ABSTRACT

An information processing device according to the present invention stores user attribute data and pieces of application attribute data. The information processing device retrieves the user attribute data (Sa1), retrieves application attribute data of running application programs (Sa3), and determine whether there is application attribute data matching the user attribute data (Sa5). If the determination is affirmative, the information processing device identifies an application program corresponding to the application attribute data, and subsequently identifies a window (subject window) corresponding to the identified application program (Sa6). The information processing device sets priority levels for the subject window and windows overlapping the subject window so that the priority level for the subject window is higher than those of the windows (Sa8), and changes a display order of the subject window and the windows in accordance with the priority levels for the subject window and the windows (Sa9).

24 Claims, 5 Drawing Sheets

(56) References Cited

OTHER PUBLICATIONS

Chinese Office Action for CN200810108166X dated Jun. 12, 2010.
Japanese Office Action for Japanese Patent Application No. 2007-145543 dated Mar. 21, 2012.
Office Action with English Translation, Mailing Date—Nov. 22, 2011, issued in conjunction with JP Patent Application No. 2007-145543.
European Communication regarding Examination for corresponding Application No. 08 009946.8 dated Oct. 18, 2013.

* cited by examiner

INFORMATION PROCESSING DEVICE AND COMPUTER READABLE MEDIUM

CROSS-REFERENCE TO RELATED APPLICATIONS

This application is based on and claims priority under 35 USC 119 from Japanese Patent Application No. 2007-145543, filed on May 31, 2007.

BACKGROUND

1. Technical Field

The present invention relates to a GUI (Graphical User Interface).

2. Related Art

JP-A-8-161139 discloses methods of controlling display of plural overlapping windows. The publication specifically discloses, when two overlapping windows are displayed on a screen, periodically switching positions of a front window and a back window, and setting a time during which a window is displayed in front, in accordance with how long each window is used.

However, according to the methods disclosed in the publication, it can happen that a window other than that preferred by a user is displayed in front. In view of the problem, the present invention provides a technique for switching display of windows in accordance with a user's preference.

SUMMARY

The present invention provides an information processing device comprising: a memory configured to store pieces of attribute data; a display; a processor configured to: retrieve first attribute data stored in the memory in association with a first running application program; retrieve second attribute data stored in the memory; identify a first window corresponding to the first running application program, which is displayed on the display; identify a second window overlapping with the first window, which is displayed on the display; if the first attribute data and the second attribute data are identical, set priority levels for the first window and the second window so that a priority level for the first window is higher than a priority level for the second window; and cause the display to display the first window whose priority level is higher, ahead of the second window whose priority level is lower.

In the information processing device, the second attribute data may be attribute data associated with a second running application program, and the processor may be configured to identify a third window corresponding to the second running application program, that is displayed on the display.

Furthermore, the information processing device may comprise an operation unit configured to enable a user to select a window displayed on the display, and the first window may be a window selected by the user by means of the operation unit.

Alternatively, the processor may be configured to, if the first window and the third window overlap, change a position of at least one of the first window and the third window so that the first window and the third window do not overlap.

In the information processing device, the first attribute data may be associated with an attribute of information provided by the first running application program.

Furthermore, the processor may be configured to: if information provided by the first running application program changes, retrieve third attribute data stored in the memory in association with the first running application program; if the third attribute data and the second attribute data are identical, set priority levels for the first window and the second window so that a priority level for the first window is higher than a priority level for the second window; and cause the display to display the first window whose priority level is higher, ahead of the second window whose priority level is lower.

The information processing device may further comprise an operation unit configured to enable a user to select a window displayed on the display, and if the processor identifies a third window overlapping with the first window, that is displayed on the display and that is a window selected by the user by means of the operation unit, the processor may cause the display to display the third window on top.

The present invention provides a computer readable medium that stores a program for causing a processor of a computer comprising: a memory configured to store pieces of attribute data; and a display, to execute: retrieve first attribute data stored in the memory in association with a first running application program; retrieve second attribute data stored in the memory; identify a first window corresponding to the first running application program, that is displayed on the display; identify a second window overlapping with the first window, that is displayed on the display; if the first attribute data and the second attribute data are identical, set priority levels for the first window and the second window so that a priority level for the first window is higher than a priority level for the second window; and cause the display to display the first window whose priority level is higher, ahead of the second window whose priority level is lower.

[Effects]

According to an aspect of the present invention, it is possible to switch the display of windows in accordance with user's preference.

BRIEF DESCRIPTION OF THE DRAWINGS

Embodiments of the present invention will now be described in detail with reference to the following figures, wherein.

DETAILED DESCRIPTION

Embodiments of the present invention will be described with reference to the drawings.

[First Embodiment]

Figure 1:
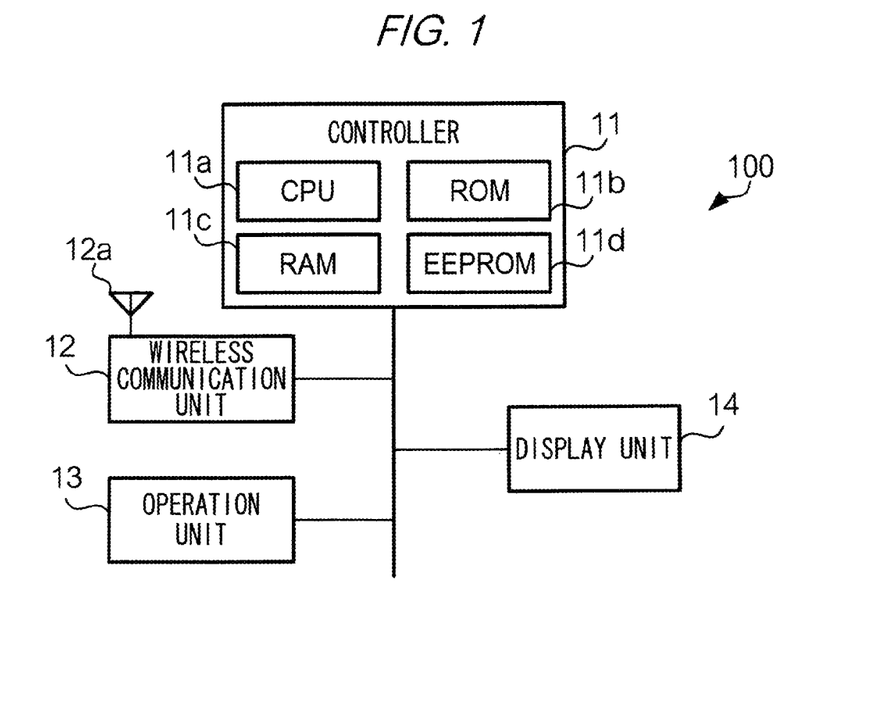
FIG. 1 is a block diagram illustrating a configuration of an information processing device according to the present invention.

FIG. 1 is a block diagram illustrating a configuration of information processing device 100 according to the first embodiment of the present invention. As shown in the drawing, information processing device 100 comprises controller 11, wireless communication unit 12, operation unit 13, and display unit 14. Information processing unit 100 is a mobile phone.

Controller 11 has CPU (Central Processing Unit) 11*a*, ROM (Read Only Memory) 11*b*, RAM (Random Access Memory) 11*c*, and EEPROM (Electronically Erasable and Programmable ROM) 11*d*. CPU 11*a* executes a program stored in ROM 11*b* or EEPROM 11*d* while using RAM 11*c* as a work area, to control components of information processing device 100. Wireless communication unit 12 has antenna 12*a*, and wirelessly communicates data with a predetermined network. Operation unit 13 has operation keys, and provides an operation signal corresponding to a user's operation to controller 11. Display unit 14 has a liquid crystal display and a driving circuit, and displays an image on the basis of image data provided from controller 11.

ROM 11*b* stores preinstalled programs; specifically, a multitasking operating system (hereinafter referred to as "multitasking OS"), a Java (Registered Trademark) platform, and native application programs. The multitasking OS is an operating system supporting functions such as allocation of virtual memory spaces, which are necessary to realize a pseudo-parallel execution of plural tasks using a TSS (Time-Sharing System). The Java platform is a bundle of programs that are described in accordance with a CDC (Connected Device Configuration) which is a configuration for providing Java execution environment 113 (described later) in information processing device 100 with a multitasking OS. Native application programs are programs for providing information processing device 100 with basic functions such as voice communication.

EEPROM 11*d* has a Java application program storage area for storing Java application programs. A Java application program consists of: a JAR (Java ARchive) file including a main program that is a sequence of instructions executed under Java execution environment 113, and image files and audio files used when the main program is running; and an ADF (Application Descriptor File) in which information on installation and execution of the main program and attribute information of the main program are described. A Java application program is created by a carrier who provides a data communication service and a content provider, and stored in a server, and in response to a request from information processing device 100, is sent to the device from the server.

Figure 2:
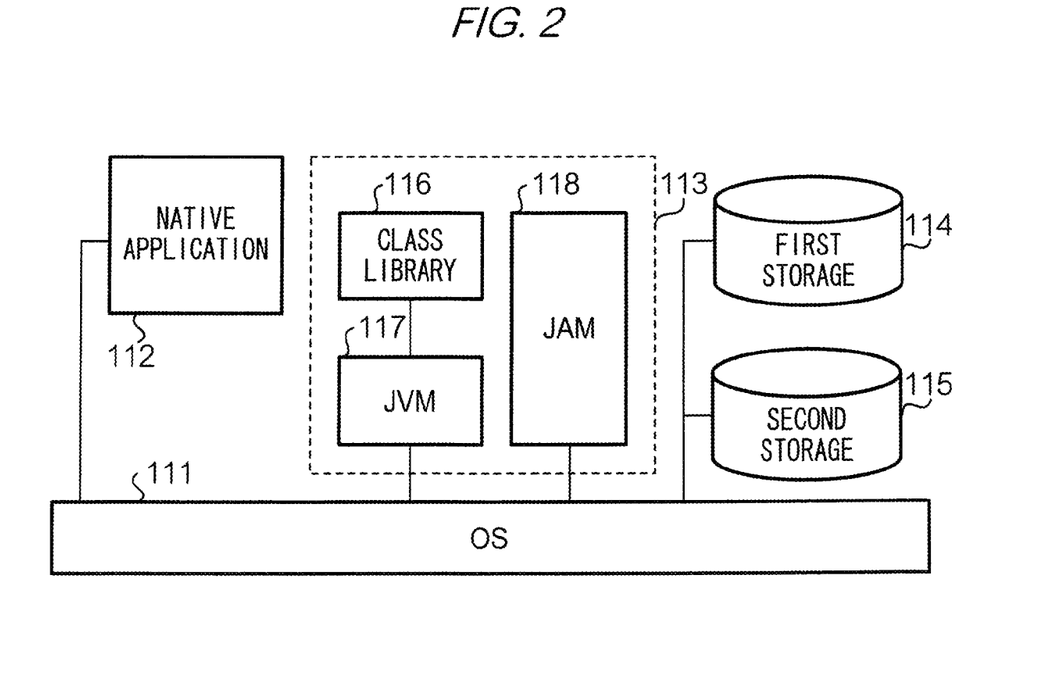
FIG. 2 is a diagram illustrating a logical configuration of an information processing device.

FIG. 2 is a diagram illustrating a logical configuration of units provided in controller 11 of information processing device 100 through execution of programs stored in ROM 11*b* and EEPROM 11*d*. As shown in the drawing, in controller 11, native application 112 and Java execution environment 113 are provided in OS 111. In EEPROM 11*d*, first storage 114 and second storage 115 are secured.

Java execution environment 113 is provided through execution of Java platform stored in ROM 11*b*. Java execution environment 113 includes class library 116, JVM (Java Virtual Machine) 117, and JAM (Java Application Manager) 118. Class library 116 is a collection of program modules (classes) that provide a particular function. JVM 117 provides a Java execution environment optimized for a CDC, and provides a function of interpreting and executing bytecode provided as a Java application program. JAM 118 provides a function of managing download, installation, execution, or termination of a Java application program.

First storage 114 is a storage for storing Java application programs (JAR files and ADFs) downloaded under the control of JAM 118. Second storage 115 is a storage for storing data that is generated during execution of a Java application program, after the program is terminated. A storage area of second storage 115 is assigned to each of installed Java application programs. Data of a storage area assigned to a Java application program can be rewritten during execution of the program, and cannot be rewritten during execution of another Java application program.

ROM 11*b* or EEPROM 11*d* stores attribute data of stored application programs (native application programs and Java application programs). The data is hereinafter referred to as "application attribute data". Application attribute data indicates a category such as business, sports, or entertainment. Application attribute data may be described in a program for realizing the application by a creator of the program. Alternatively, application attribute data may be set by a user of information processing device 100. In the latter case, application attribute data may be stored independently from a program for realizing the application.

EEPROM 11*d* also stores attribute data of a user of information processing device 100. The data is hereinafter referred to as "user attribute data". User attribute data indicates a category, as in the case of application attribute data. User attribute data is set by a user of information processing device 100, and may be reset as needed.

The foregoing is a description of the configuration of an embodiment of information processing device 100. Information processing device 100 with the above configuration executes an application program in response to a request from a user to execute the program. The request is input by use of operation unit 13. Information processing device 100 is, when executing plural application programs at once, able to display plural windows each of which corresponds to each application program.

In the present embodiment, a "window" means a display area assigned to each application program when the program is used to provide services. The shape of a window may be optional, although in drawings referred to in the following description, windows are depicted as having a rectangular shape. When two windows overlap, one is on top of the other, with the covered part of the lower window not visible. In the following description, a position of a window, a part of which is covered by another window, is referred to as "bottom".

Information processing device 100 displays windows in an overlap window method. The information processing device 100 is able to display a window on top of another window in accordance with a user's instruction. To that end, controller 11 of information processing device 100 stores data on display positions and a display order of windows (hereinafter referred to as "window data"), and if one of the windows is moved, updates the stored data. A "display order" means an order of windows starting from a top window. If there are overlapping windows, information processing device 100 displays on top a window that has been focused (or selected) most recently. In the following description, a status of a focused window is referred to as "active". Accordingly, it can be said that an active window is displayed on top.

Information processing device 100, if there are overlapping windows, determines a priority level relating to display of each window, on the basis of application attribute data associated with an application program corresponding to each window, and user attribute data, and controls a display order of the windows on the basis of the determined priority levels. The operation is carried out in information processing device 100 as shown in FIG. 3.

Figure 3:
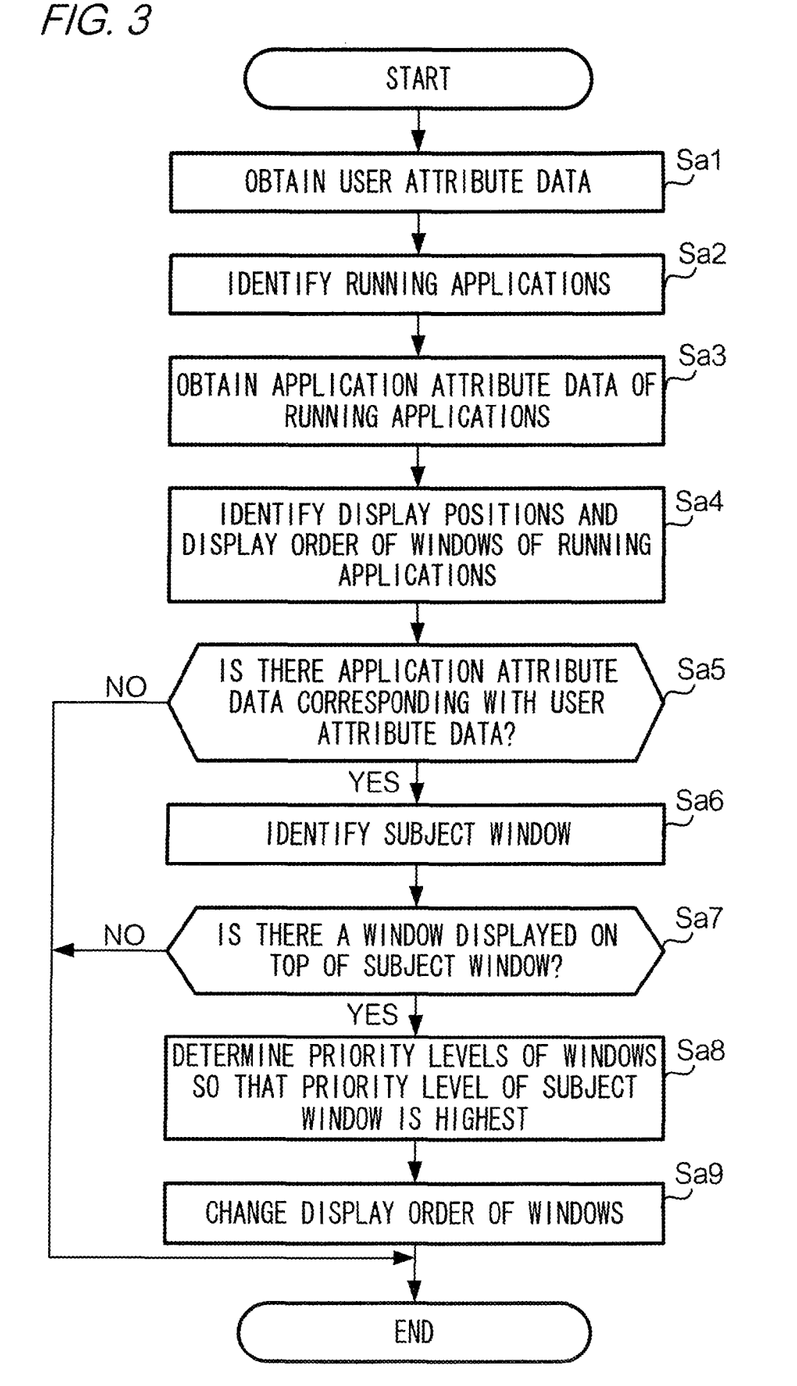
FIG. 3 is a flowchart showing an operation of an information processing device.

FIG. 3 is a flowchart showing an operation carried out by controller 11 of information processing device 100. The operation is carried out by a function of a multitasking OS in response to a predetermined event such as appearance of a new window or a change in the display position of a window. The operation may be carried out at predetermined intervals.

As shown in the flowchart, controller 11 obtains user attribute data from EEPROM 11d (step Sa1). Controller 11 also identifies an application programs running on information processing device 100 (step Sa2). After identifying the running application programs, controller 11 obtains application attribute data of the identified application programs (step Sa3). Controller 11 also identifies display positions and a display order of windows corresponding to the identified application programs with reference to window data (step Sa4).

Subsequently, controller 11 determines whether application attribute data obtained at step Sa3 includes user attribute data obtained at step Sa1 (step Sa5). If the determination is affirmative (step Sa5: YES), controller 11 identifies an application program corresponding to the application attribute data, and subsequently identifies a window corresponding to the identified application program (hereinafter referred to as "subject window") (step Sa6). Controller 11 determines whether there is a window displayed on top of the subject window (step Sa7).

If the determination is affirmative (step Sa7: YES), controller 11 prioritizes display of the subject window. Specifically, controller 11 sets priority levels for the subject window and windows displayed on top of the subject window so that the priority level for the subject window is higher than the priority levels for the windows displayed on top of the subject window (step Sa8). Controller 11 does not set priority levels for windows that are not displayed on top of the subject window.

After setting priority levels, controller 11 changes the display order of the windows displayed on display unit 14 on the basis of the priority levels (step Sa9). Specifically, controller 11 changes the display order of the windows so that a window of higher priority level is displayed ahead of a window of lower priority level. After that, controller 11 outputs screen data representing a screen on which the windows are arranged in the changed display order. Controller 11 also updates the window data to store the changed display order.

If the determination at step Sa5 or Sa7 is negative, namely if application attribute data obtained at step Sa3 does not include user attribute data obtained at step Sa1, or if there is no window displayed on top of the subject window, controller 11 ends the operation without changing the display order of the windows. This is because in such cases the subject window is already displayed on top without being obscured by another window.

Now, the above operation will be described with reference to a concrete example of a display of windows. In the following description, as application programs whose windows are displayed, application program "a" for providing a game service and application program "b" for providing a spreadsheet function are assumed. Application attribute data of application program "a" is "entertainment", and application attribute data of application program "b" is "business". The application programs may be a Java application program or a native application program.

Figures 4A, 4B:
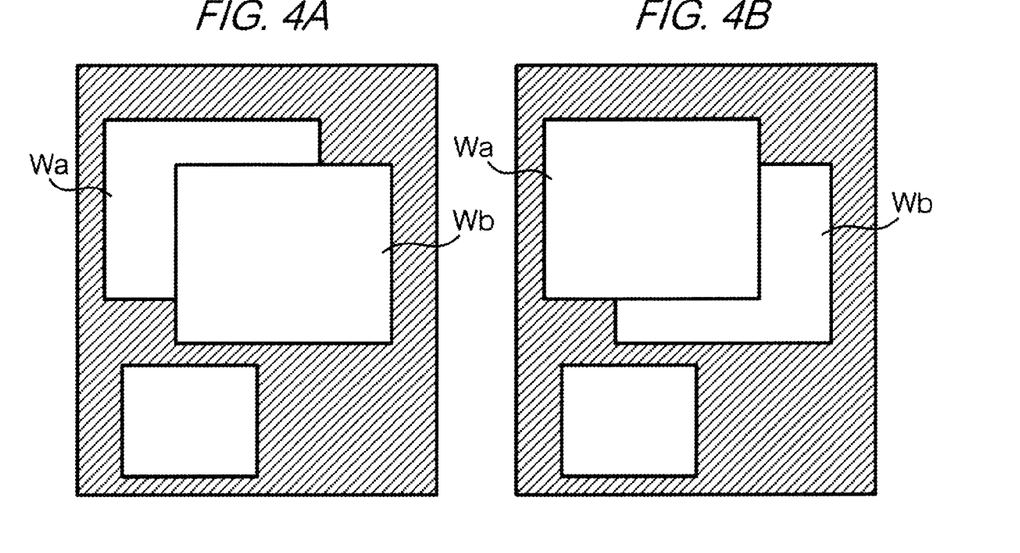
FIGS. 4A and 4B are diagrams illustrating windows displayed on a screen.

Windows corresponding to application programs "a" and "b" are displayed as shown in FIG. 4A. In the drawing, a window corresponding to application program "a" is window Wa, and a window corresponding to application program "b" is window Wb. In the drawing, window Wb corresponding to application program "b" is displayed on top of window Wa corresponding to application program "a".

While windows are displayed in such a manner, if user attribute data set by a user is "entertainment", controller 11 displays window Wa on top because application program "a" is associated with application attribute data matching the user attribute data. As a result, a screen displayed on display unit 14 changes from the screen shown by FIG. 4A to a screen shown by FIG. 4B. On the other hand, if user attribute data set by a user is "business", a screen displayed on display unit 14 does not change from the screen shown by FIG. 4A to a screen shown by FIG. 4B. This is because window Wb corresponding to application program "b" associated with application attribute data matching the user attribute data is already displayed on top.

As described above, according to information processing device 100, a window corresponding to an application program associated with attribute data set by a user is preferentially displayed. Accordingly, a user of information processing device 100 is able to activate and browse a desired window, when plural overlapping windows are displayed, with fewer operations of the device. The operation of information processing device 100 is helpful especially when the device is a small one such as a mobile phone with a multitasking feature which has small operation keys and a small screen.

[Second Embodiment]

The present embodiment is a modification of the first embodiment. The difference between the present embodiment and the first embodiment is that in the first embodiment, user attribute data and application attribute data are compared with each other, and a window corresponding to an application program associated with application attribute data matching the user attribute data is preferentially displayed, whereas, in the present embodiment, pieces of application attribute data are compared with each other, and windows corresponding to application programs associated with common application attribute data are preferentially displayed.

The difference between an information processing device according to the present embodiment and information processing device 100 of the first embodiment is only that the information processing device according to the present embodiment does not store user attribute data. Accordingly, components and signs shown in FIG. 1 will be referred to in the following description. Each step of an operation of an information processing device 100 of the present embodiment is similar to a corresponding step of an operation of information processing device 100 of the first embodiment, except as may otherwise be provided.

Application programs executed by information processing device 100 of the present embodiment include an application program for providing information that varies with time. The application program will be referred to as "variable application program". A variable application program provides, for example, a feature of obtaining content from a network via wireless communication unit 12, storing the content in RAM 11c, and causing display unit 14 to display the stored content. When new content is obtained from a network, the new content is displayed in place of the old one. An example of a variable application program is an application program for providing the latest news.

In the present embodiment, an attribute is assigned to each content provided by a variable application program, and application attribute data of the variable application program changes depending on the content being provided by the program. Attribute data representing attribute of content may be provided together with the content from a network, and the attribute data of the content may be used as application attribute data of a variable application program.

Figure 5:
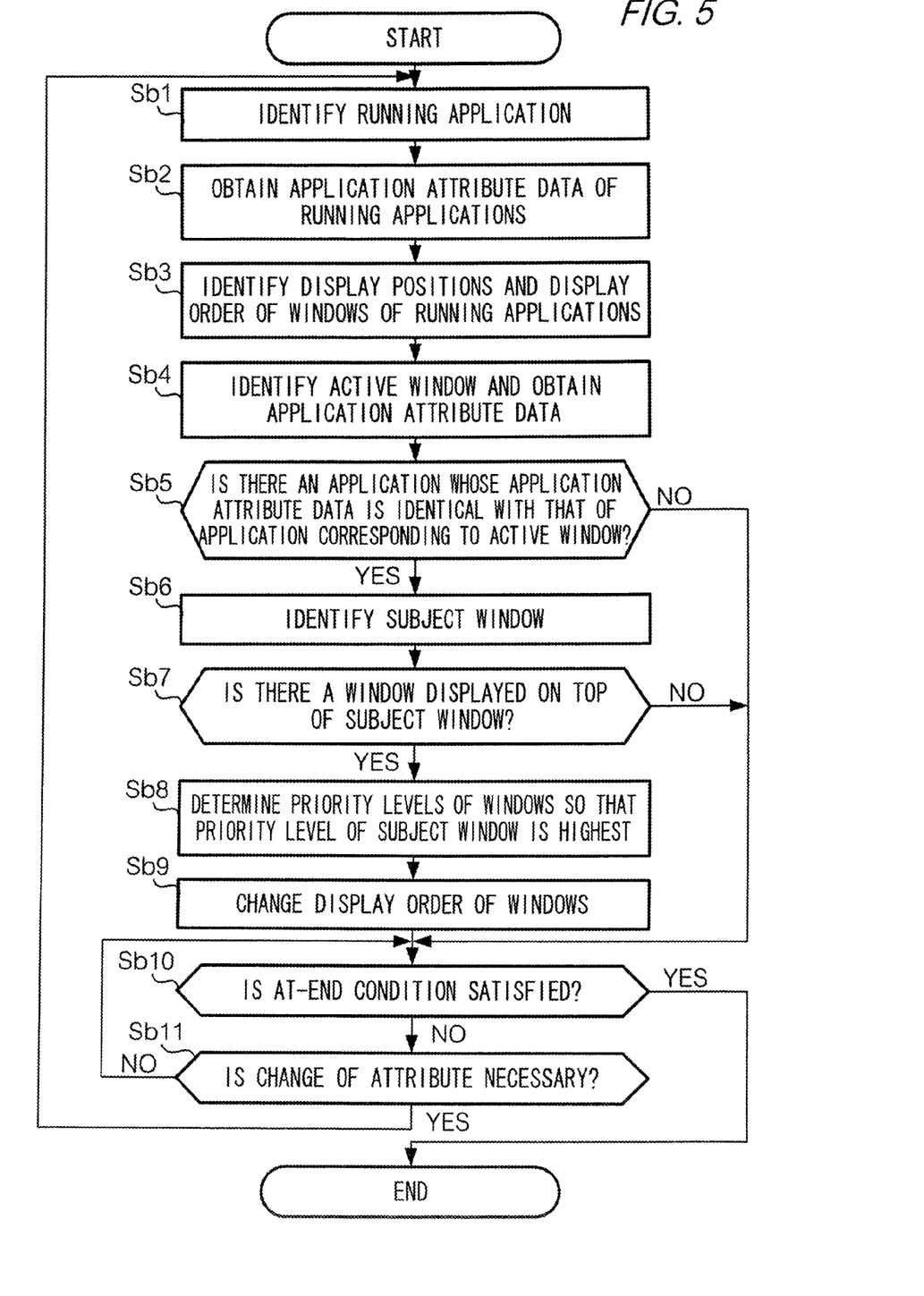
FIG. 5 is a flowchart showing an operation of an information processing device.

FIG. 5 is a flowchart showing an operation carried out by controller 11 of information processing device 100. The operation is carried out until a predetermined termination condition is satisfied. The condition is that a window is maximized so that the window occupies the entire display area or that all windows are closed. Alternatively, the condition may be that there are no windows that overlap with other windows. The operation is carried out in response to an interrupt process instructed by a user.

As shown in the flowchart, controller 11 identifies application programs running on information processing device 100 (step Sb1). After identifying running application programs, controller 11 obtains application attribute data of the identified application programs (step Sb2). Controller 11 also identifies display positions and a display order of windows corresponding to the identified application programs with reference to window data (step Sb3).

Subsequently, controller 11 identifies an active window from among the windows corresponding to the identified application programs, and also identifies an application program corresponding to the active window and application attribute data of the application program (step Sb4). In other words, controller 11 identifies a window displayed on top, and also identifies an application program corresponding to the window and application attribute data of the application program.

Subsequently, controller 11 determines whether there is an application program associated with application attribute data matching the identified application attribute data (step Sb5). Specifically, controller 11 determines whether there is an application program among the application programs identified at step Sb1, that is associated with the application attribute data identified at step Sb4. It is to be noted that in the determination the application program corresponding to the active window is not considered.

If the determination is affirmative (step Sb5: YES), controller 11 identifies a window corresponding to an application program which is associated with the application attribute data identified at step Sb4 (step Sb6). In the present embodiment, the identified window is referred to as "subject window". Controller 11 determines whether there is a window displayed on top of the subject window (step Sb7).

If the determination is affirmative (step Sb7: YES), controller 11 prioritizes display of the subject window. Specifically, controller 11 sets priority levels for the subject window and windows displayed on top of the subject window so that the priority level for the subject window is higher than the priority levels for the windows displayed on top of the subject window (step Sb8). When doing so, if a window displayed on top of the subject window is active, controller 11 may set the priority levels so that a priority level for the active window is higher than the priority level for the subject window.

After setting priority levels, controller 11 changes the display order of the windows displayed on display unit 14 on the basis of the priority levels (step Sb9). Specifically, controller 11 changes the display order of the windows so that a window of higher priority level is displayed ahead of a window of a lower priority level. After that, controller 11 outputs screen data representing a screen on which the windows are arranged in the changed display order. Controller 11 also updates the window data to store the changed display order. If the determination at step Sb5 or Sb7 is negative, controller 11 does not change the display order of the windows.

After changing the display order of the windows, or if the determination at step Sb5 or Sb7 is negative, controller 11 determines whether a predetermined termination condition is satisfied (step Sb10). If the determination is affirmative (step Sb10: YES), controller 11 ends the operation.

If the determination is negative (step Sb10: NO), controller 11 determines whether there is a change in application attribute data of the running application programs (step Sb11). When the determination is made, if content provided by a variable application program has change; as a result, application attribute data of the program has changed, the determination is affirmative.

If the determination is affirmative (step Sb11: YES), controller 11 repeats the operation from step Sb1, and if necessary, changes the display order of the windows. If the determination is negative (step Sb11: NO), controller 11 again determines whether the predetermined termination condition is satisfied (step Sb10). Controller 11 repeats step Sb10 and step Sb11 until there is a change in application attribute data of the running application programs or the predetermined termination condition is satisfied.

Now, the above operation will be described with reference to a concrete example of a display of windows. In the following description, as application programs whose windows are displayed, application program "a" for providing a game service, application program "b" for providing a spreadsheet function, application program "c" for providing a calculator function, application program "d" for providing news ("ticker") are assumed. A ticker is an application program for receiving news via wireless communication unit 12, and sequentially displaying it. Application attribute data of application program "a" is "entertainment", and application attribute data of application programs "b" and "c" is "business". Application attribute data of application program "d" is, since application program "d" is a variable application program, dependent on news provided by the program.

Figure 6A:
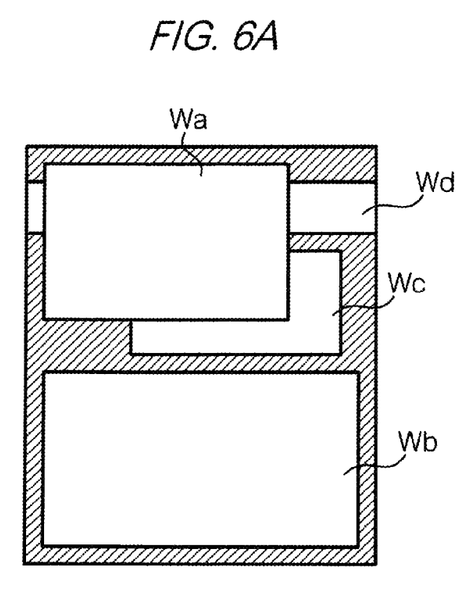
FIGS. 6A, 6B, and 6C are diagrams illustrating windows displayed on a screen.

Windows corresponding to application programs a, b, c, and d are displayed as shown in FIG. 6A. In the drawing, a window corresponding to application program "a" is window Wa, a window corresponding to application program "b" is window Wb, a window corresponding to application program "c" is window Wc, and a window corresponding to application program "d" is window Wd. It is assumed that window Wb corresponding to application program "b" is active, and window Wd corresponding to application program "d" is displaying news having attribute other than "business".

Figure 6B:
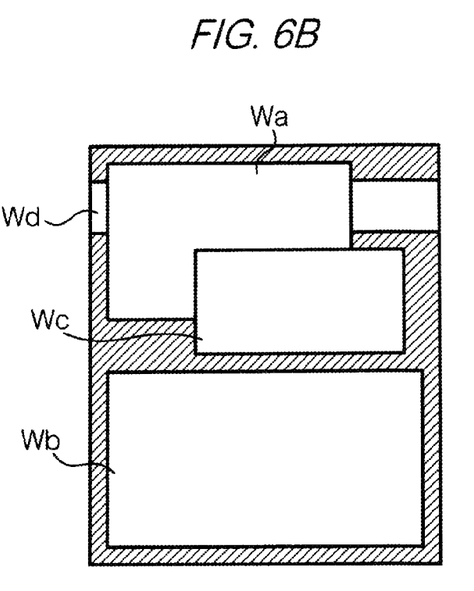

While windows are displayed in such a manner, if an operation shown in FIG. 5 is carried out by information processing device 100, window Wc corresponding to application program "c" is preferentially displayed because the program is associated with application attribute data which is identical with that of application program "b". As a result, a screen displayed on display unit 14 changes from the screen shown by FIG. 6A to a screen shown by FIG. 6B.

Later, if news displayed in window Wd corresponding to application program "d" is changed to one having attribute of "business", window "d" is preferentially displayed as well. As a result, a screen displayed on display unit 14 changes from the screen shown by FIG. 6B to a screen shown by FIG. 6C.

Figure 6C:
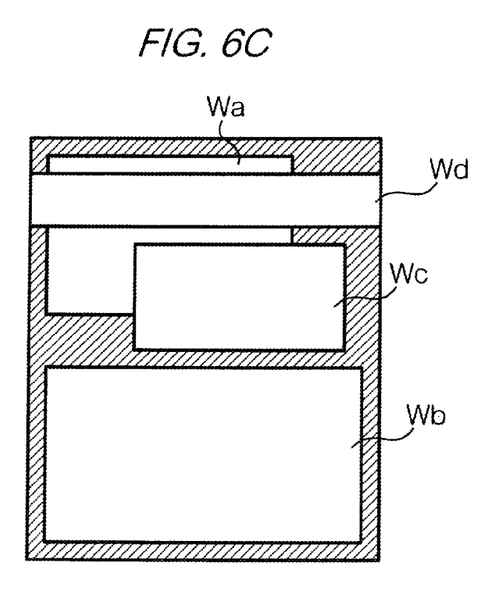

In this situation, if a user selects and activates window Wd of application program "d" which is a variable application program, the display order of the windows is changed depending on the news provided by the program so that a window corresponding to an application program having application attribute data identical with that of the displayed news is displayed on top.

As described above, according to information processing device 100 of the present embodiment, windows corresponding to application programs associated with common application attribute data are preferentially displayed. Accordingly, a user of information processing device 100, who uses an application program relating to, for example, business, is able to browse a window corresponding to another application program relating to business at the same time.

Also, according to information processing device 100 of the present embodiment, where it is determined whether there is a change in application attribute data of application programs, and if a change occurs, priority levels for windows are reset, the display order of the windows is changed in response to the change.

[Modifications]

The above embodiments may be modified as described below. Please note that the following modifications may be made in combination.

(1) Modification 1

In the above embodiments, in addition to a display order of windows, positions of the windows may be changed. For example, in the second embodiment, when an active window and a window corresponding to an application program associated with the same application attribute data as that of an application program corresponding to the active window are preferentially displayed, either or both positions of the windows may be moved so that they do not overlap with each other.

Alternatively, in the first embodiment, if a window to be displayed on top is positioned at the edge of a screen of display unit 14, the window may be moved to the center of the screen to make it easier to browse the window. Alternatively, the window may be enlarged to make it easier to browse the window.

(2) Modification 2

In the second embodiment, a variable application program may output information as audio information, not visual information. A variable application program may be an application program for outputting news as audio information or an application program for playing music.

If a variable application program is an application program for playing music, genres or performers of music may be set as attribute data. If a user is able to set his/her favorite musical genres or musical performers, s/he has a window corresponding to the application program displayed on top when music of his/her favorite genre or performer is played.

(3) Modification 3

Figure 7:
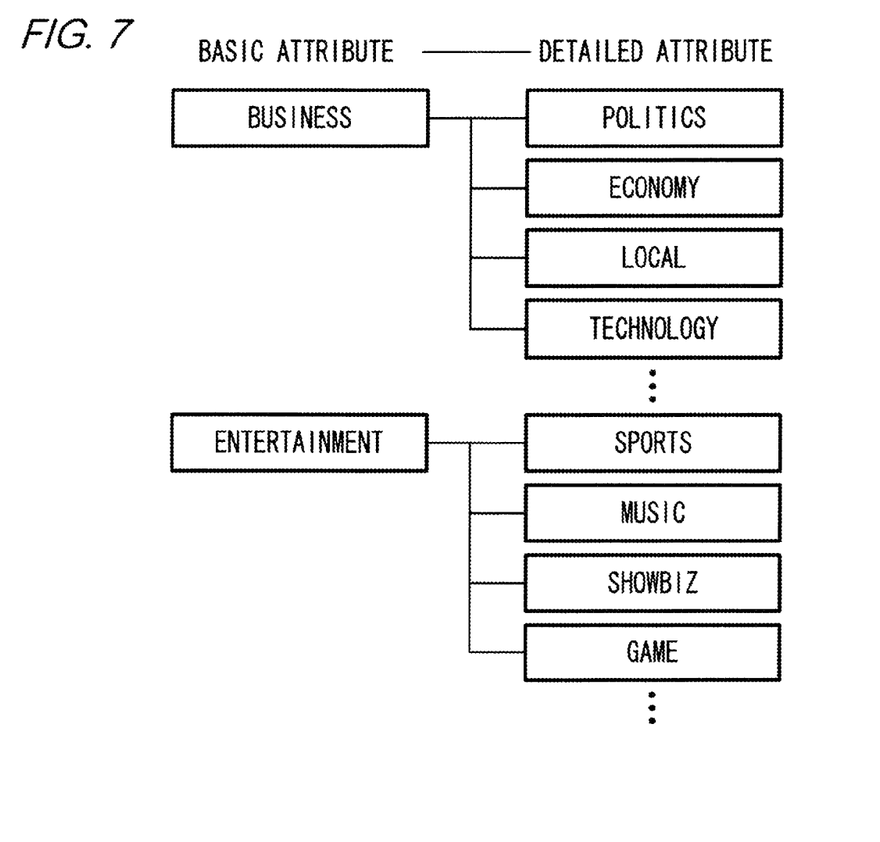
FIG. 7 is a diagram illustrating examples of attribute data.

In the above embodiments, attribute data (user attribute data and application attribute data) may indicate different attributes. For example, attribute data may indicate a basic attribute and a detailed attribute that is a subcategory of the basic attribute. FIG. 7 is a diagram illustrating examples of a basic attribute and a detailed attribute. In the drawing, a basic attribute, such as "business" is subdivided into detailed attributes, for example, "politics", "economy", "local", and "technology", and a basic attribute, such as "entertainment" is subdivided into detailed attributes, for example, "sports", "show business", "music", and "game".

If a detailed attribute is designated in addition to a basic attribute by a user, and there are plural windows corresponding to application programs associated with the basic attribute, a window corresponding to an application program associated with the detailed attribute in addition to the basic attribute is preferentially displayed.

(4) Modification 4

If attribute data indicates a basic attribute and a detailed attribute as discussed in modification 3, priority levels for windows may be set as described below. If there is an application program associated with both a basic attribute and a detailed attribute, a priority level for a window corresponding to the application program may be set at the highest level; if there is an application program associated with only a basic attribute, a priority level for a window corresponding to the application program may be set at the second highest level; and if there is an application program associated with neither a basic attribute nor a detailed attribute, a priority level for a window corresponding to the application program may be set at the lowest level.

(5) Modification 5

In the first embodiment, if there is no application program associated with application attribute data matching user attribute data, it may be determined whether there is an application program associated with application attribute data relevant to the user attribute data. Similarly, in the second embodiment, if there is no application program associated with application attribute data matching application attribute data of an application program corresponding to an active window, it may be determined whether there is an application program associated with application attribute data relevant to the application attribute data of the application program corresponding to the active window. Data on which attribute data is relevant to which attribute data may be stored in ROM 11*b* or EEPROM 11*d*.

(6) Modification 6

In the above embodiments, user attribute data may be changed according to the current circumstances of an information processing device such as time or location. For example, it is possible to cause an information processing device to preferentially display a window corresponding to an application program associated with application attribute data of basic attribute "business" during office hours, and to preferentially display a window corresponding to an application program associated with application attribute data of basic attribute "entertainment" outside of office hours.

Alternatively, an information processing device may be provided with a unit for locating the device, and user attribute data may be changed according to a location of the device.

(7) Modification 7

In the second embodiment, where application attribute data of an application program corresponding to an active window is obtained, and a window corresponding to an application program associated with application attribute data matching the obtained application attribute data is preferentially displayed, application attribute data of an application program corresponding to an inactive window may be obtained, and a window corresponding to an application program associated with application attribute data matching the obtained application attribute data may be preferentially displayed.

(8) Modification 8

In the above embodiments, priority levels for windows corresponding to some application programs may be fixed. If a window corresponding to such an application program overlaps other windows, a display order of the window may be determined on the basis of a fixed priority level. If the fixed priority level is the highest level, the window may be displayed on top. Such an application program may include an application program for displaying an alert message to a user. Such an application program may be selected by a user, and data on the application program may be stored in a controller.

(9) Modification 9

In the above embodiments, an information processing device may be a mobile phone, a PDA (Personal Digital Assistance), or a personal computer.

(10) Modification 10

A program for realizing the operation of FIG. 3 or 5 may be provided as an application program or a plug-in. The program may be provided via a recording medium such as an optical disk or via a network such as the Internet.

What is claimed is:

1. An information processing device comprising:
   a memory configured to store pieces of attribute data;
   a display;

a processor configured to:
retrieve first attribute data stored in the memory in association with a first running application program;
retrieve second attribute data stored in the memory, wherein the first attribute data and second attribute data are each indicative of a category of an application program and wherein the second attribute data is set by a user;
identify a first window corresponding to the first running application program, which is displayed on the display;
identify a second window overlapping with the first window, which is displayed on the display;
if the first attribute data and the second attribute data match, set priority levels for the first window and the second window so that a priority level for the first window is higher than a priority level for the second window;
cause the display to display the first window whose priority level is higher, ahead of the second window whose priority level is lower; and
wherein the second attribute data is changed in accordance with a predetermined time.

2. The information processing device according to claim 1, wherein:
the second attribute data is attribute data associated with a second running application program; and
the processor is configured to identify a third window corresponding to the second running application program, that is displayed on the display.

3. The information processing device according to claim 2, further comprising an operation unit configured to enable a user to select a window displayed on the display, wherein the first window is a window selected by the user by means of the operation unit.

4. The information processing device according to claim 2, wherein the processor is configured to, if the first window and the third window overlap, change a position of at least one of the first window and the third window so that the first window and the third window do not overlap.

5. The information processing device according to claim 1, wherein the first attribute data is associated with attribute of information provided by the first running application program.

6. The information processing device according to claim 5, wherein the processor is configured to:
if information provided by the first running application program changes, retrieve third attribute data stored in the memory in association with the first running application program;
if the third attribute data and the second attribute data match, set priority levels for the first window and the second window so that a priority level for the first window is higher than a priority level for the second window; and
cause the display to display the first window whose priority level is higher, ahead of the second window whose priority level is lower.

7. The information processing device according to claim 1, further comprising an operation unit configured to enable a user to select a window displayed on the display, wherein if the processor identifies a third window overlapping with the first window, that is displayed on the display and that is a window selected by the user by means of the operation unit, the processor causes the display to display the third window on top.

8. A computer readable medium storing a program for causing a processor of a computer comprising:
a memory configured to store pieces of attribute data; and
a display, to execute:
retrieve first attribute data stored in the memory in association with a first running application program;
retrieve second attribute data stored in the memory, wherein the first attribute data and second attribute data are each indicative of a category of an application program and wherein the second attribute data is set by a user;
identify a first window corresponding to the first running application program, that is displayed on the display;
identify a second window overlapping with the first window, that is displayed on the display;
if the first attribute data and the second attribute data match, set priority levels for the first window and the second window so that a priority level for the first window is higher than a priority level for the second window;
cause the display to display the first window whose priority level is higher, ahead of the second window whose priority level is lower; and
wherein the second attribute data is changed in accordance with a predetermined time.

9. An information processing device according to claim 1, wherein the information processing device is a mobile phone.

10. An information processing device according to claim 1, wherein the second attribute data is changed in accordance with location of the information processing device.

11. A computer readable medium according to claim 8, wherein the computer is a mobile phone.

12. A computer readable medium according to claim 8, wherein the second attribute data is changed in accordance with location of the computer.

13. An information processing device comprising:
a memory configured to store pieces of attribute data;
a display;
a processor configured to:
retrieve first attribute data stored in the memory in association with a first running application program;
retrieve second attribute data stored in the memory, wherein the first attribute data and second attribute data are each indicative of a category of an application program and wherein the second attribute data is set by a user;
identify a first window corresponding to the first running application program, which is displayed on the display;
identify a second window overlapping with the first window, which is displayed on the display;
if the first attribute data and the second attribute data match, set priority levels for the first window and the second window so that a priority level for the first window is higher than a priority level for the second window;
cause the display to display the first window whose priority level is higher, ahead of the second window whose priority level is lower; and
wherein the second attribute data is changed in accordance with location of the information processing device.

14. The information processing device according to claim 13, wherein:
the second attribute data is attribute data associated with a second running application program; and
the processor is configured to identify a third window corresponding to the second running application program, that is displayed on the display.

15. The information processing device according to claim 14, further comprising an operation unit configured to enable a user to select a window displayed on the display, wherein the first window is a window selected by the user by means of the operation unit.

16. The information processing device according to claim 14, wherein the processor is configured to, if the first window and the third window overlap, change a position of at least one of the first window and the third window so that the first window and the third window do not overlap.

17. The information processing device according to claim 13, wherein the first attribute data is associated with attribute of information provided by the first running application program.

18. The information processing device according to claim 17, wherein the processor is configured to:
- if information provided by the first running application program changes, retrieve third attribute data stored in the memory in association with the first running application program;
- if the third attribute data and the second attribute data match, set priority levels for the first window and the second window so that a priority level for the first window is higher than a priority level for the second window; and
- cause the display to display the first window whose priority level is higher, ahead of the second window whose priority level is lower.

19. The information processing device according to claim 13, further comprising an operation unit configured to enable a user to select a window displayed on the display, wherein if the processor identifies a third window overlapping with the first window, that is displayed on the display and that is a window selected by the user by means of the operation unit, the processor causes the display to display the third window on top.

20. An information processing device according to claim 13, wherein the information processing device is a mobile phone.

21. An information processing device according to claim 13, wherein the second attribute data is changed in accordance with a predetermined time.

22. A computer readable medium storing a program for causing a processor of a computer comprising:
- a memory configured to store pieces of attribute data; and
- a display, to execute:
  - retrieve first attribute data stored in the memory in association with a first running application program;
  - retrieve second attribute data stored in the memory, wherein the first attribute data and second attribute data are each indicative of a category of an application program and wherein the second attribute data is set by a user;
  - identify a first window corresponding to the first running application program, that is displayed on the display;
  - identify a second window overlapping with the first window, that is displayed on the display;
  - if the first attribute data and the second attribute data match, set priority levels for the first window and the second window so that a priority level for the first window is higher than a priority level for the second window;
  - cause the display to display the first window whose priority level is higher, ahead of the second window whose priority level is lower; and
  - wherein the second attribute data is changed in accordance with location of the computer.

23. A computer readable medium according to claim 22, wherein the computer is a mobile phone.

24. A computer readable medium according to claim 22, wherein the second attribute data is changed in accordance with a predetermined time.

* * * * *